(12) United States Patent
Phan

(10) Patent No.: US 12,490,686 B2
(45) Date of Patent: *Dec. 9, 2025

(54) BRACKET SYSTEM FOR ATTACHING A CANTILEVERED PERGOLA TO A ROOF RAFTER

(71) Applicant: Toan Phan, Oakley, CA (US)

(72) Inventor: Toan Phan, Oakley, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/076,901

(22) Filed: Dec. 7, 2022

(65) Prior Publication Data

US 2024/0090387 A1  Mar. 21, 2024

Related U.S. Application Data

(63) Continuation-in-part of application No. 17/899,217, filed on Aug. 30, 2022, now Pat. No. 11,566,415.

(51) Int. Cl.
*E04B 1/38* (2006.01)
*A01G 9/12* (2006.01)
*E04D 13/00* (2006.01)

(52) U.S. Cl.
CPC ............... *A01G 9/12* (2013.01); *E04D 13/00* (2013.01)

(58) Field of Classification Search
CPC .................................. A01G 9/12; E04D 13/00
See application file for complete search history.

(56) References Cited

U.S. PATENT DOCUMENTS

| | | | |
|---|---|---|---|
| 2,037,736 A | 4/1936 | Payne et al. |
| 2,768,434 A | 10/1956 | Taylor |
| 2,931,129 A | 4/1960 | Boniface |
| 3,107,401 A | 10/1963 | Heirich |
| 3,333,875 A | 8/1967 | Tracy |
| 3,988,872 A | 11/1976 | Adamson et al. |
| D248,447 S | 7/1978 | Hornung |
| 4,856,252 A | 8/1989 | Cornell |
| 5,156,484 A | 10/1992 | Allen |
| 5,236,273 A | 8/1993 | Gilb |
| 5,299,395 A | 4/1994 | Smith et al. |
| 5,526,614 A | 6/1996 | Huang |
| 5,966,890 A | 10/1999 | Inman |

(Continued)

OTHER PUBLICATIONS

International Written Opinion for the corresponding application PCT/US2023/011210, dated Apr. 5, 2023, 10 pages.

(Continued)

*Primary Examiner* — Basil S Katcheves
(74) *Attorney, Agent, or Firm* — Goldstein Law Offices, P.C.

(57) ABSTRACT

A bracket system, for suspending pergola beams from an existing structure, the existing structure having a vertical wall and roof rafters that each have a rafter top and a rafter end that extends beyond the vertical wall over a ground surface, each of the pergola beams having a supported end, including a plurality of brackets. Each bracket having a mounting assembly for attaching to one of the rafters, a support assembly for attaching the support end of one of the pergola beams, and a connecting assembly that suspends the support assembly from the mounting assembly. The pergola beams extend over the ground surface, away from the existing structure, supported only by the bracket at the support end and without any vertical supports.

7 Claims, 11 Drawing Sheets

(56) References Cited

U.S. PATENT DOCUMENTS

| | | | |
|---|---|---|---|
| 5,975,471 | A | 11/1999 | Dishman |
| 7,024,825 | B2 | 4/2006 | Kebeli |
| 7,475,517 | B2 | 1/2009 | Kawai et al. |
| 7,739,841 | B1 | 6/2010 | Puckett |
| 8,720,155 | B1 | 5/2014 | Robell |
| 9,428,902 | B1 | 8/2016 | LoFranco et al. |
| 9,605,425 | B1 | 3/2017 | Hendry |
| 9,822,524 | B1 | 11/2017 | Mezarich |
| 10,100,508 | B1 | 10/2018 | Fox |
| 10,132,074 | B2 | 11/2018 | Pace |
| 10,167,888 | B2 | 1/2019 | Barker |
| 10,184,504 | B1 | 1/2019 | Carroll |
| 10,246,876 | B2 | 4/2019 | Brean |
| 10,309,095 | B2 | 6/2019 | Hildestad et al. |
| 10,358,811 | B1 | 7/2019 | Fox |
| 10,465,389 | B2 | 11/2019 | Hughes |
| 10,738,457 | B1 | 8/2020 | Hendry |
| 10,745,907 | B1 | 8/2020 | Canby |
| 10,907,342 | B1 | 2/2021 | Parkhouse et al. |
| 11,149,431 | B1 | 10/2021 | Meznarich |
| 11,566,415 | B1 * | 1/2023 | Phan ............... E04B 1/2612 |
| 2002/0112439 | A1 | 8/2002 | Rosas |
| 2011/0197536 | A1 * | 8/2011 | Clark ............... E04F 10/08 52/650.1 |
| 2014/0020230 | A1 * | 1/2014 | Jolley ............... H10F 19/00 248/316.1 |
| 2016/0168840 | A1 | 6/2016 | Monty et al. |
| 2016/0177560 | A1 | 6/2016 | Hensen et al. |
| 2016/0190974 | A1 | 6/2016 | Dickey et al. |
| 2017/0306612 | A1 | 10/2017 | Kasprzak et al. |
| 2018/0073240 | A1 | 3/2018 | Meznarich |
| 2018/0230697 | A1 | 8/2018 | Albert |
| 2018/0334801 | A1 | 11/2018 | Brean |
| 2019/0093366 | A1 | 3/2019 | Hughes |
| 2019/0100933 | A1 * | 4/2019 | Volin ............... E04H 1/1205 |
| 2020/0291643 | A1 | 9/2020 | Marlow |
| 2022/0356724 | A1 * | 11/2022 | Bergman ............ E04H 12/2223 |

OTHER PUBLICATIONS

International Search Report for the corresponding application PCT/US2023/011210, dated Apr. 5, 2023, 10 pages.

International Preliminary Report on Patentability of the International Preliminary Examining Authority for PCT/US2023/011210 established by the IPEA/US completed on Oct. 7, 2024.

\* cited by examiner

BRACKET SYSTEM FOR ATTACHING A CANTILEVERED PERGOLA TO A ROOF RAFTER

CROSS-REFERENCE TO RELATED APPLICATIONS

This application is a continuation-in-part of non-provisional patent application Ser. No. 17/899,217 filed in the United States Patent Office on Aug. 30, 2022, claims priority therefrom, and is expressly incorporated herein by reference in its entirety.

TECHNICAL FIELD

The present disclosure relates generally to a structural system for attaching a cantilevered pergola or trellis to a dwelling. More particularly, the present disclosure relates to a bracket that allows individual beam members of a pergola to be attached to the roof rafters of the dwelling.

BACKGROUND

Pergolas and trellises are often provided to complement a structure, by providing support for vines and climbing plants, and by providing shade that increases the space that may be comfortably occupied on sunny days.

Trellises can differ in configuration from generally vertical structures to facilitate a rose bush or climbing vine, to those that have overhead beams as commonly found in all pergolas. While there are some technical differences between a trellis and a pergola, both standardly require the support of vertical posts that are secured to the ground surface. Such vertical posts therefore have a footprint that occupies space that might interfere with other uses of that space and may cause a discontinuity in an otherwise open area.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a pergola structure that spans across a ground surface and does not require support from the ground surface. Accordingly, the present disclosure provides a pergola structure that attaches to the roofline of an existing structure and is cantilevered to extend horizontally therefrom.

It is another aspect of an example embodiment in the present disclosure to provide a pergola structure that attaches to existing roof rafters of the structure. Accordingly, a bracket is provided that secures to the roof rafter and supports a pergola beam.

Accordingly, the present disclosure describes a bracket system, for suspending pergola beams from an existing structure, the existing structure having a vertical wall and roof rafters that each have a rafter top and a rafter end that extends beyond the vertical wall over a ground surface, each of the pergola beams having a supported end, including a plurality of brackets. Each bracket having a mounting assembly for attaching to one of the rafters, a support assembly for attaching the support end of one of the pergola beams, and a connecting assembly that suspends the support assembly from the mounting assembly. The pergola beams extend over the ground surface, away from the existing structure, supported only by the bracket at the support end and without any vertical supports.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
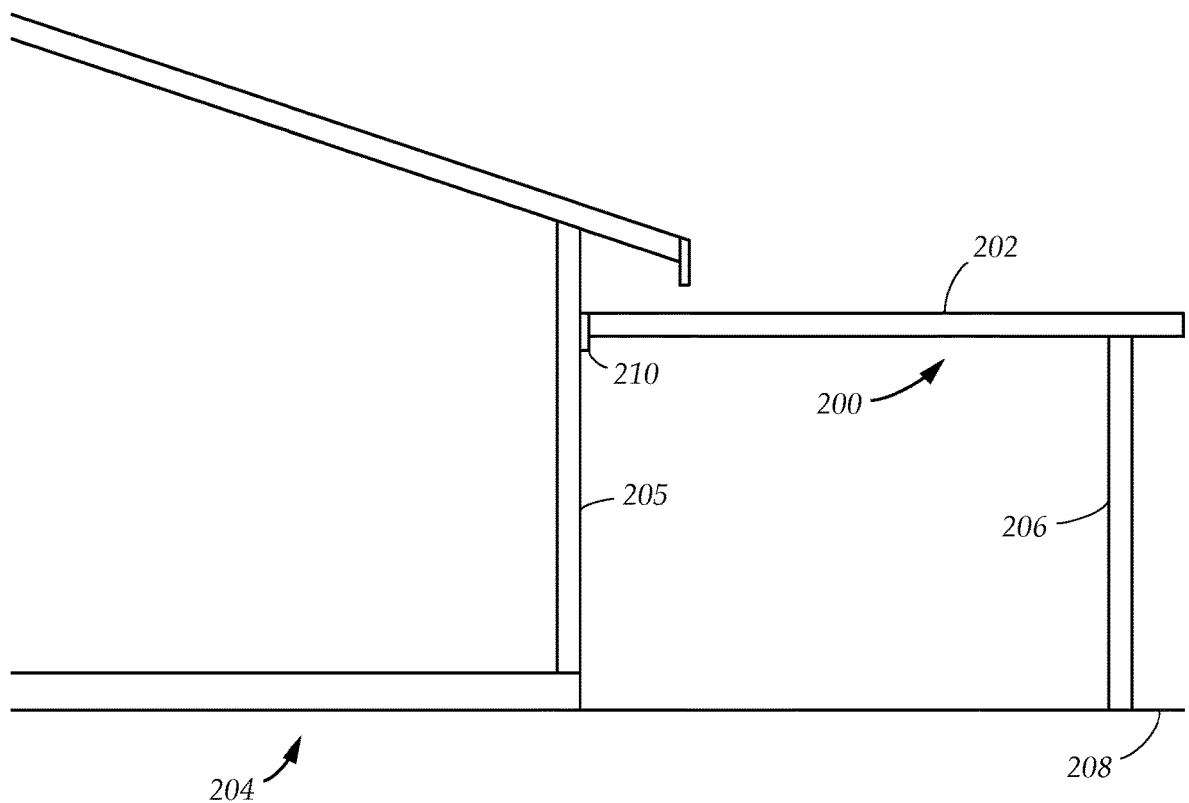
FIG. 1 is a side elevational view, illustrating a prior art example of a pergola structure attached to the side of a dwelling and supported by vertical support posts.

FIG. 1 illustrates a standard pergola 200 as found in the prior art. The standard pergola has a series of horizontal beams 202 that are attached on one end to a dwelling 204, and are supported near an opposite end with at least one vertical post 206, which is itself supported by a ground surface 208. The dwelling 204 has a vertical wall 205, and the horizontal beams 202 are attached to the dwelling 204 by a ledger board 210 that extends horizontally on the vertical wall 205.

Figure 2:
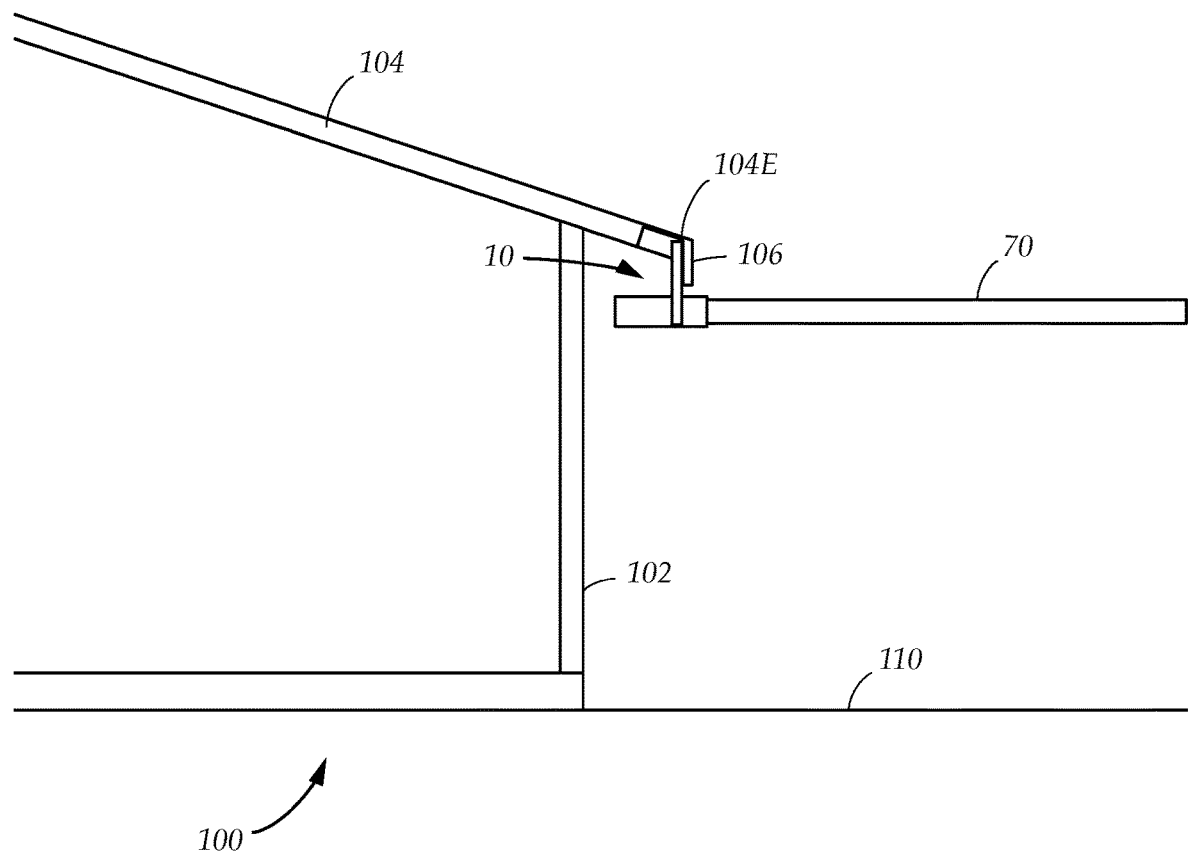
FIG. 2 is a side elevational view, illustrating a pergola structure that is cantilevered from an existing dwelling and supported solely by the roof rafters thereof.

In accordance with the principles of the present disclosure, in FIG. 2 an existing structure 100 Is illustrated, having a vertical wall 102 and a plurality of roof rafters 104 that extend laterally beyond the vertical wall 102, on a downward angle therefrom. The rafters 104 are parallel to each other, as better seen in FIG. 7. Each of the rafters 104 have a rafter end 104E. A fascia board 106 is secured across the rafter ends 104E. A ground surface 110 extends from the vertical wall 102 beneath the roof rafters 104 and horizontally outward for a significant distance beyond the rafter ends 104E. A plurality of brackets 10 are provided to each support a pergola beam 70 such that the pergola beams 70 extend horizontally over the ground surface 110. Each bracket 10 is secured to one of the rafters 104. The pergola beams 70 are solely supported by the brackets 10 and do not require other support. Notably, the brackets 10 allow the pergola beams 70 to extend horizontally over the ground surface 110, while the rafters 104 extend at an acute angle from the pergola beams 70.

Figure 5:
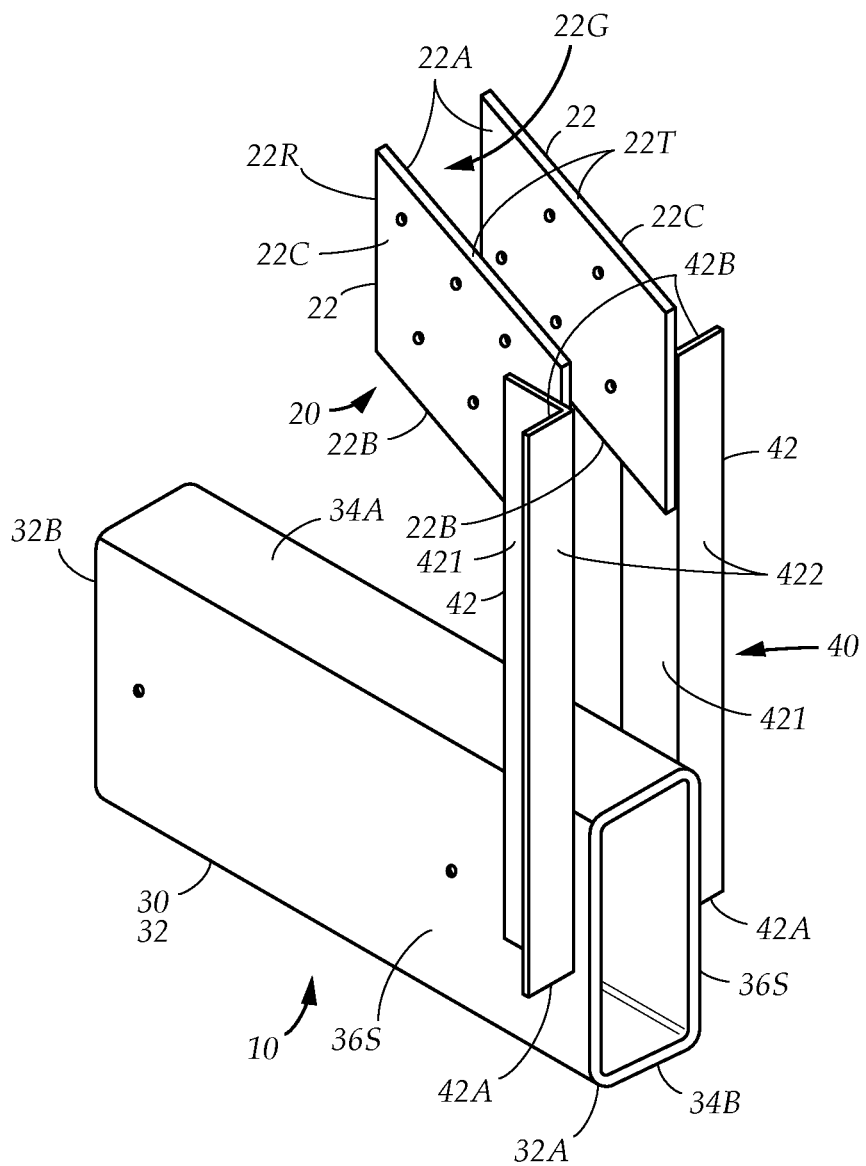
FIG. 5 is a diagrammatic perspective view of just the bracket, per se.

Referring to FIG. 5, the bracket 10 has a mounting assembly 20 that includes a pair of mounting plates 22. The bracket further has a support assembly 30, and a connecting assembly 40 that includes pair of vertical arms 42 to connect the mounting assembly 20 and support assembly 30.

The mounting plates 22 each have an inside surface 22A and an outside surface 22C, top 22T and bottom edges 22B. The mounting plates 22 extend vertically and substantially parallel to each other, with the inside surfaces 22A facing each other. The support assembly 30 has a top and is shown configured as a generally rectangular support tube 32 having an open first end 32A and an open second end 32B. Between the first end and second end are a top plate 34A and a bottom plate 34B, and a pair of side plates 36S. Note that the top plate 34A, bottom plates 34B, and side plates 36S together define the support tube 32, but the support assembly 30 need not take the extruded form illustrated, and may be constructed—for example—of discrete elements for the top plate 34A and bottom plate 34B that are connected by side plates 36S that are not fully continuous between the first end 32A and second end 32B. The vertical arms 42 of the connecting assembly 40 may each be an extruded right angle member having a longitudinal face 421 and a transverse face 422, a first end 42A and a second end 42B. The longitudinal face 421 of each vertical arm 42 is each attached to the side plates 36S near the first end 42A of said vertical arm 42. The longitudinal face 421 of each vertical arm 42 is also attached to the outside surface 22C of one of the mounting plates 22 near the second end 42B of said vertical arm 42. With the top and the top plate 34A of the support assembly 30 extending substantially horizontally, the top 22T and bottom 22B edges of each mounting plate 22 are angled upwardly at an acute angle with respect to horizontal and with respect to the top plate 34A of the support assembly 30.

Figure 6A:
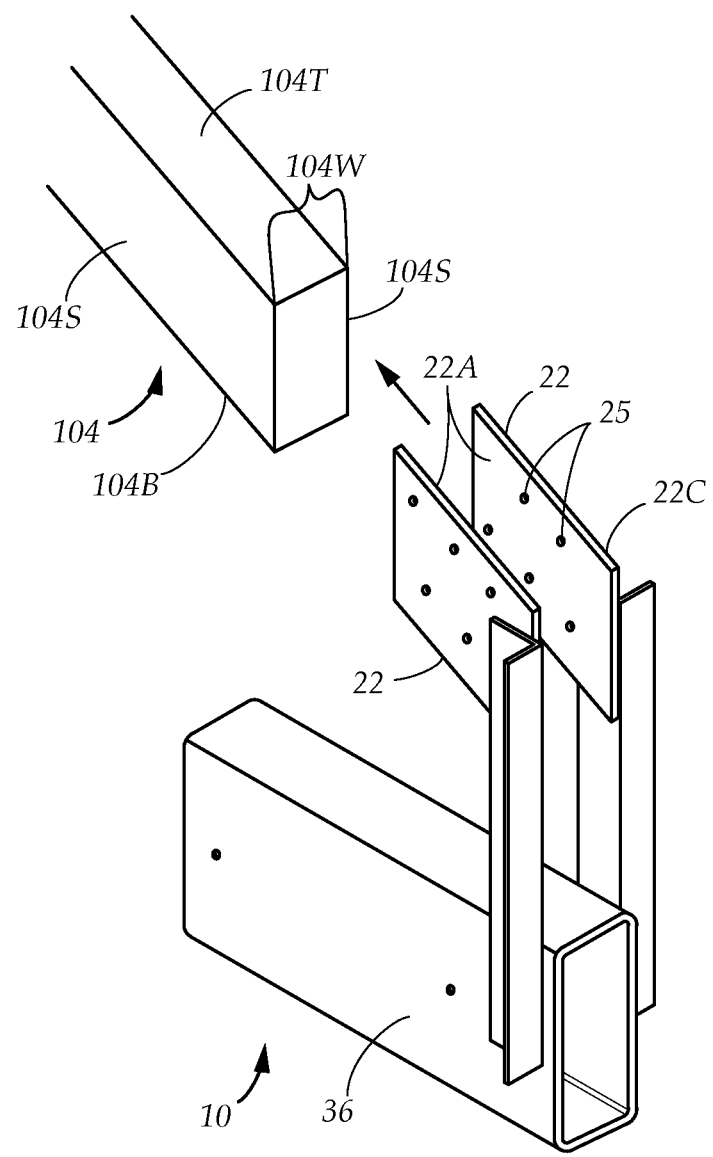
FIG. 6A is a diagrammatic perspective view, illustrating the bracket about to be attached to one of the rafters.

Referring to FIG. 6A, the bracket 10 is generally configured in accordance with dimensions of the roof rafter 104. In particular, the roof rafter 104 has a rafter top 104T, rafter sides 104S, a rafter width 104W, and wherein the inside surfaces 22A of the mounting plates 22 are separated by a distance that is substantially the same as the width 104W of the rafter 104, so that the mounting plates 22 can accommodate the rafter 104 therebetween. Note that the mounting plates 22 have mounting holes 25 that extend fully between the outside surface 22C and inside surface 22A. The mounting holes 25 may be aligned between the two mounting plates 22 to allow fasteners to extend fully therebetween, or alternatively may be offset to allow fasteners to extend from each of the mounting plates 22.

Figure 3:
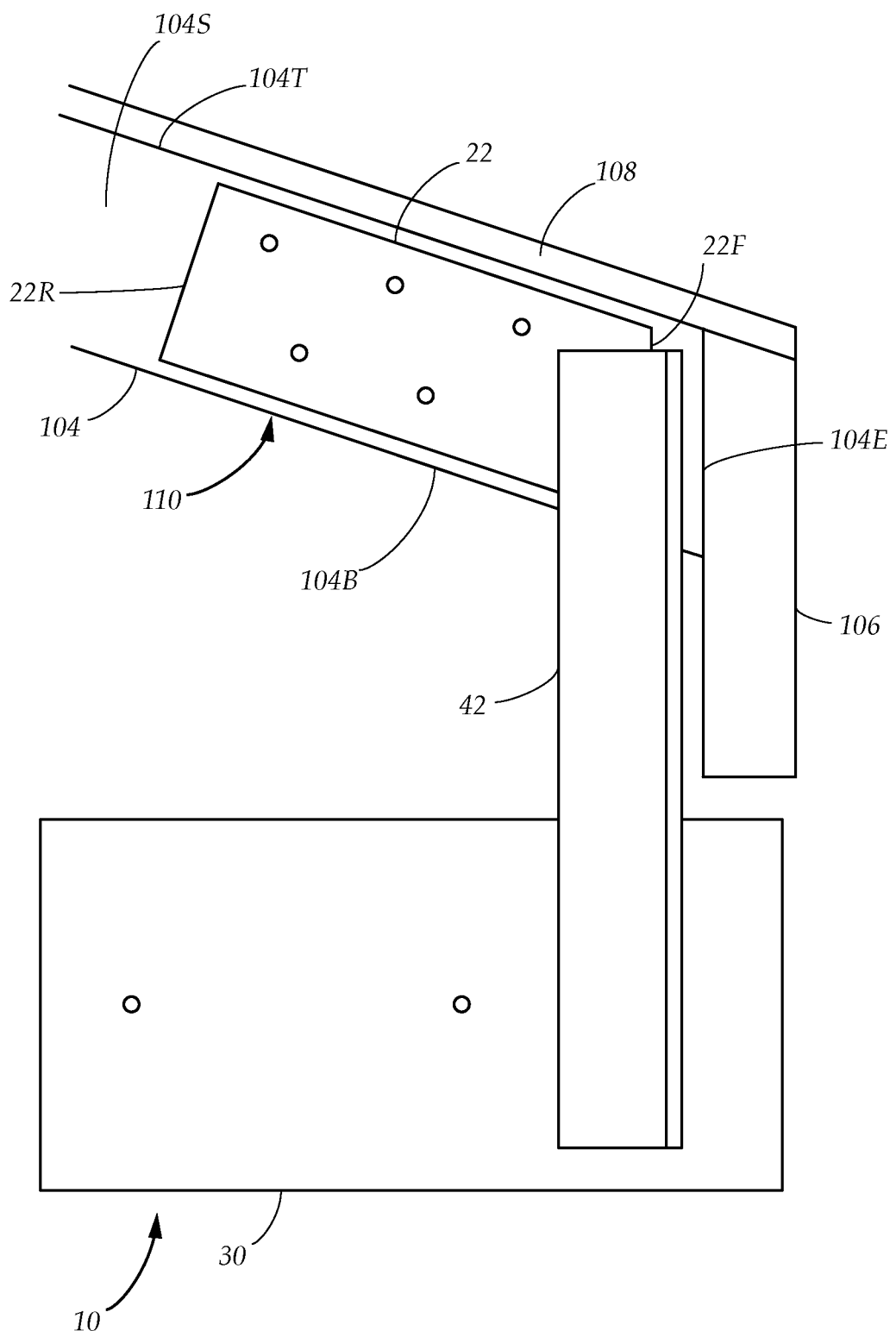
FIG. 3 is a side elevational view, illustrating a bracket as described in detail herein, the bracket attached to a roof rafter near a fascia board.
Figure 6B:
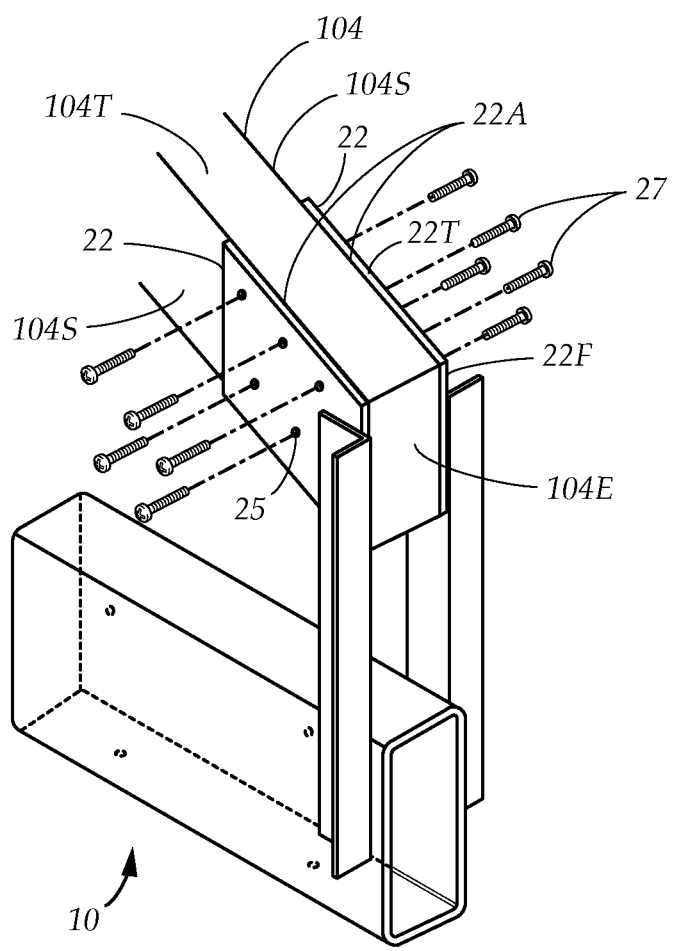
FIG. 6B is a diagrammatic perspective view illustrating the roof rafter extending within the mounting assembly, with mounting fasteners about to secure the mounting assembly to the roof rafter.

Referring to FIG. 6B, the rafter 104 has been fully inserted between the mounting plates 22 and is shown in this example with the rafter end 104E aligned with the front edge 22F of the mounting plates 22, the rafter sides 104S against the inside surfaces 22A of the mounting plates 22, and the rafter top 104T corresponding with the top edge 22T of the mounting plates 22. Mounting fasteners 27, such as screws or bolts, are inserted through the mounting holes 25 in the mounting plates 22 and into the sides 104S of the rafter 104 to secure the rafter 104 to the bracket 10. Note, referring to FIG. 3, when the rafter ends 104E are not exposed, the bracket 10 may be backed off slightly along the rafter 104 a small distance from the rafter end 104E, prior to fastening, such that front edge 22F of the mounting plates 22 are near and extend parallel to the rafter end 104E. This positions the mounting plates 22 and vertical arms 42 interior to the fascia board 106 that is secured across the rafter ends 104E. Note that the vertical arms 42 provide a vertical offset for the support assembly 30, such that the support assembly 30 is positioned below the roofline and below the fascia board 106, to thereby be at the right height for support of the pergola as described next and as will be seen in FIG. 4.

Figure 6C:
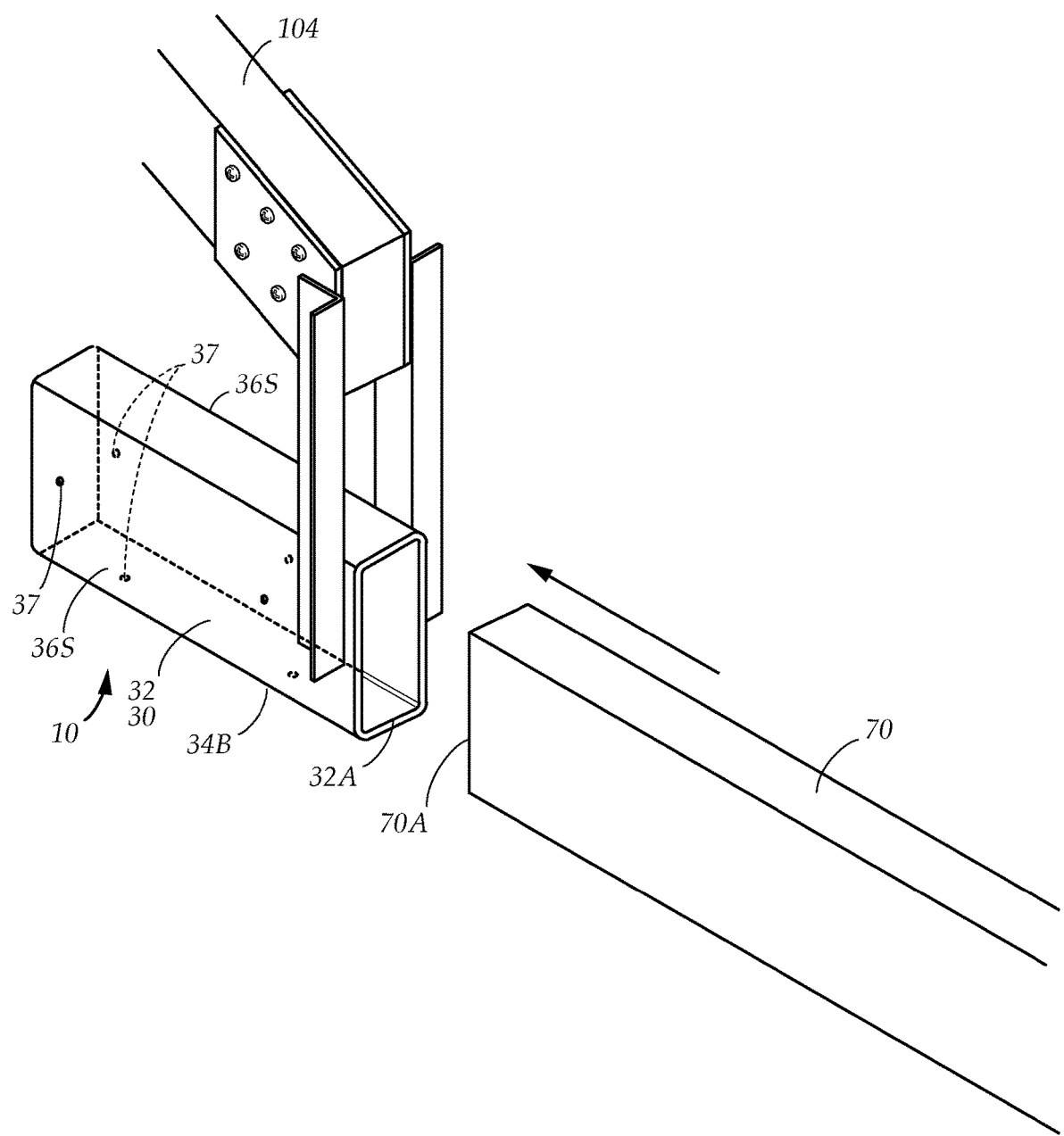
FIG. 6C is a diagrammatic perspective view, illustrating one of the pergola beams about to be inserted into the support assembly.

With the rafter 104 secured to the bracket 10, the pergola beam 70 may be inserted into the support assembly 30 as shown in FIG. 6C. In particular, the pergola beam 70 has a supported end 70A that is inserted longitudinally into the first open end 32A of the support tube 32 of the support assembly 30. To facilitate a strong structural connection with the pergola beam 70, the side plates 36S and bottom plate 34B of the support assembly 30 have support holes 37 that extend through the side plates 36S. The support holes 37 may be aligned between the side plates 36S to allow fasteners to extend fully therebetween or may be offset.

Figure 4:
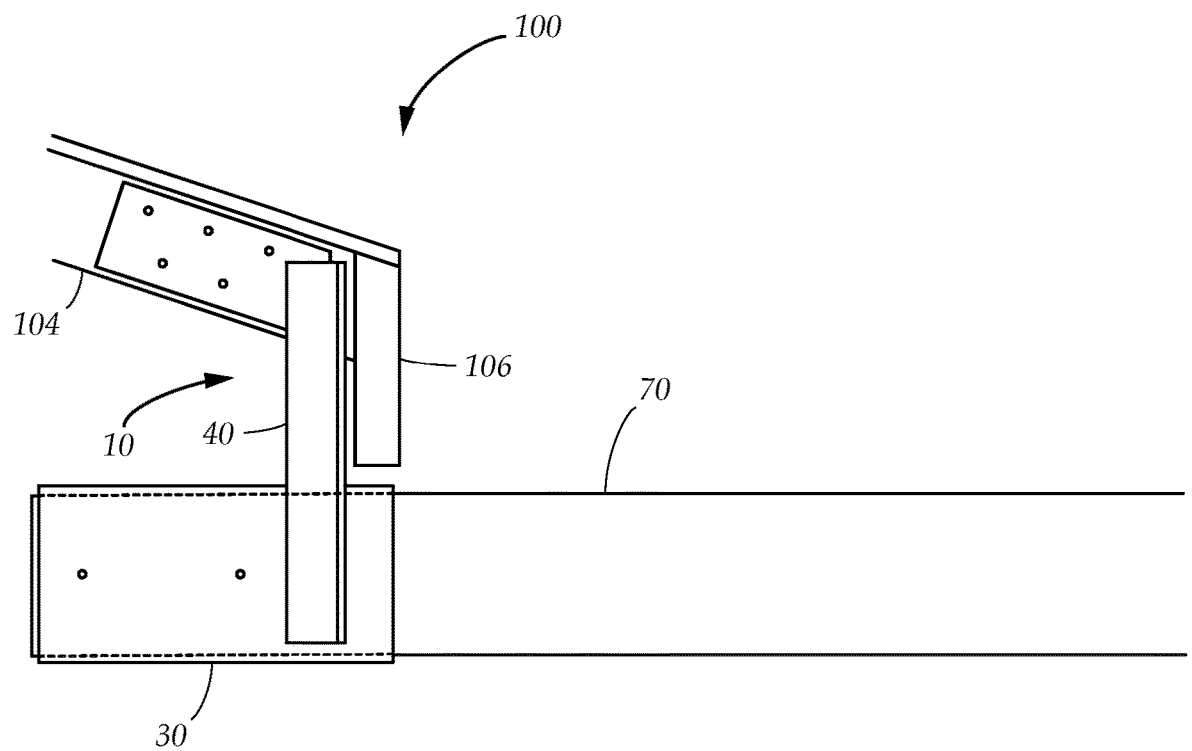
FIG. 4 is a side elevational view, illustrating a pergola beam, supported from the roof rafter by the bracket described herein.
Figure 6D:
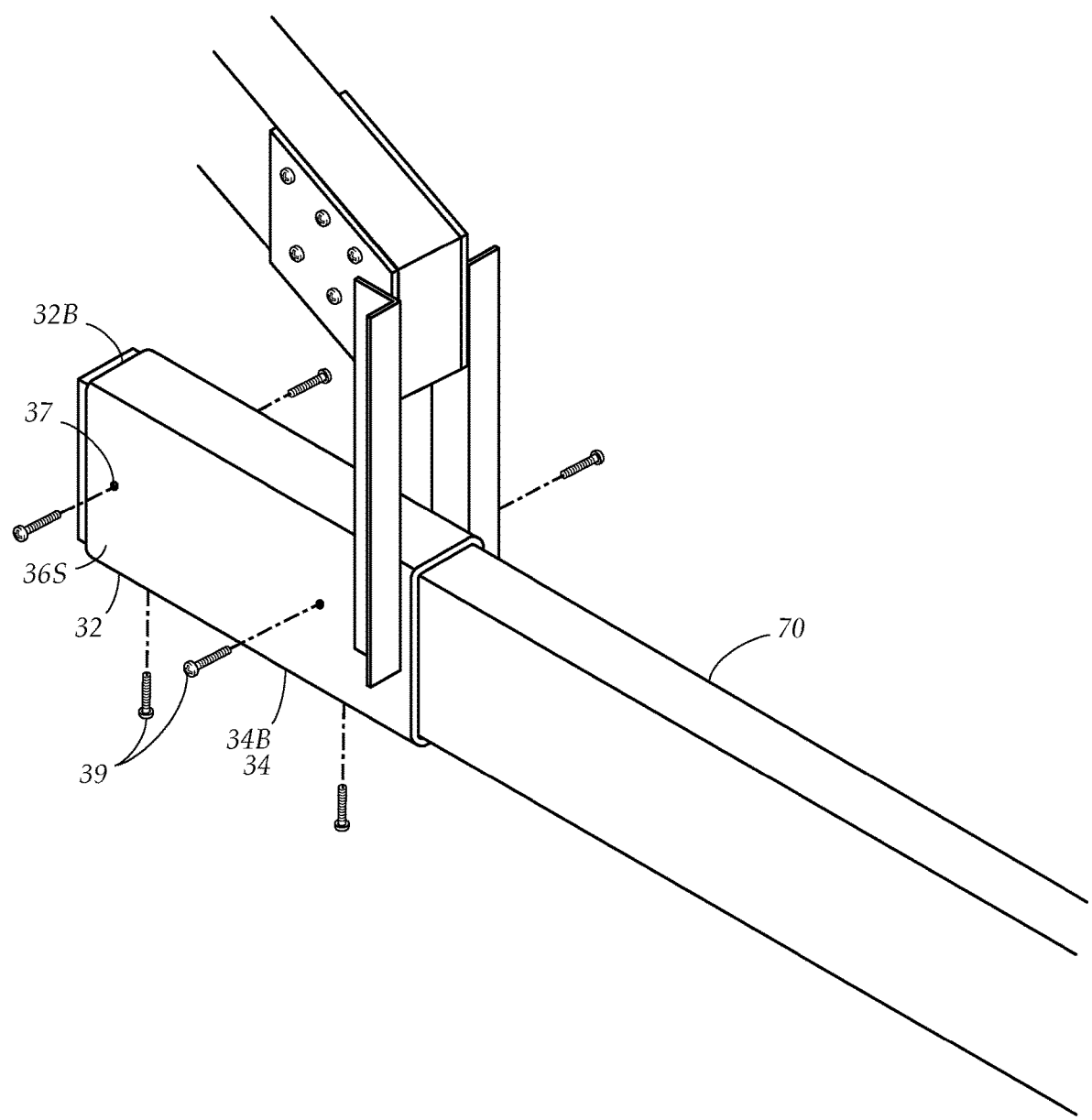
FIG. 6D is a diagrammatic perspective view, showing the pergola beam inserted fully into the support tube of the support assembly, and about to be fastened with support fasteners extending through the support holes.
Figure 6E:
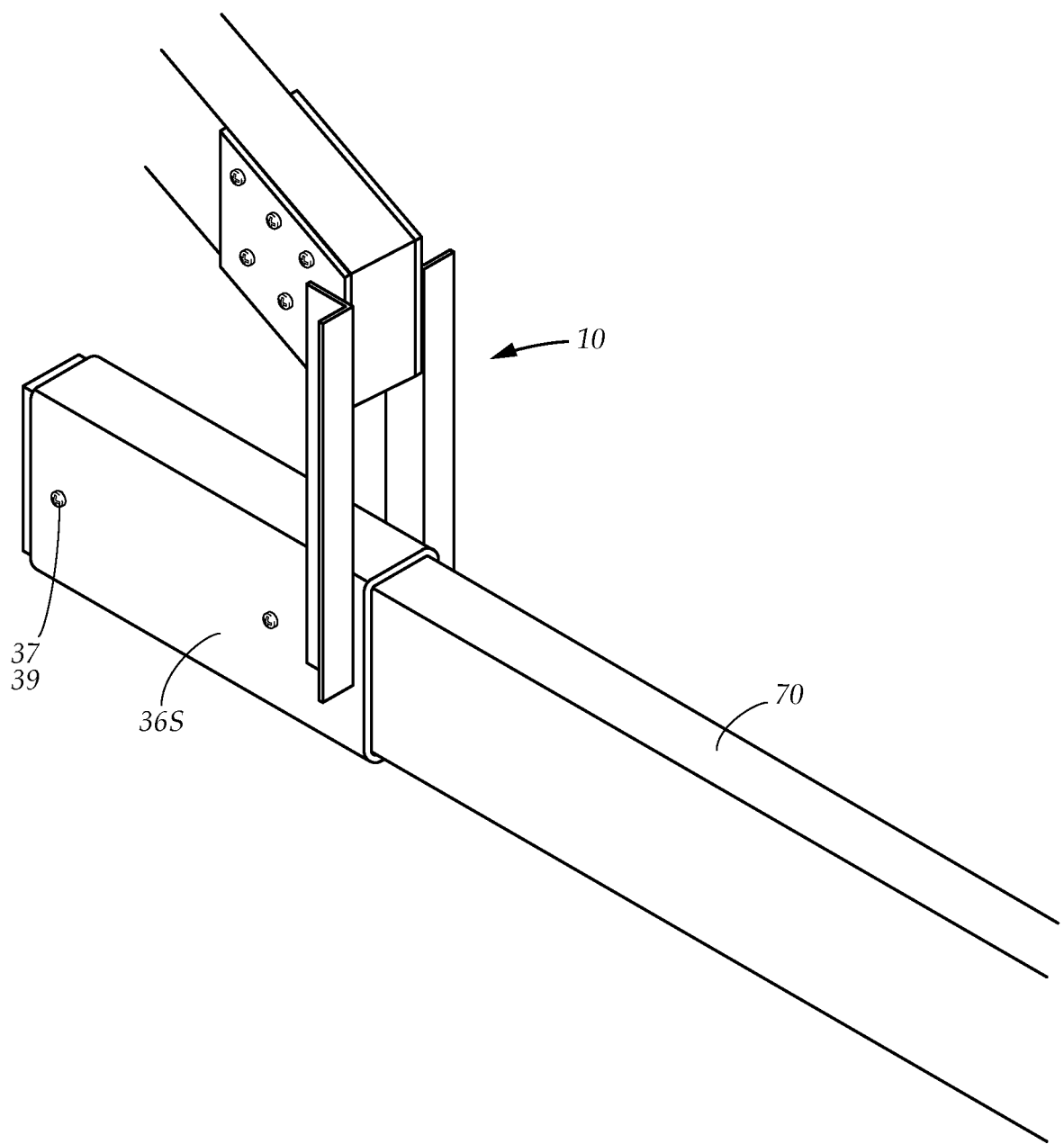
FIG. 6E is a diagrammatic perspective view, showing the pergola beam fully attached within the support assembly and thereby supported and cantilevered from the roof rafter by the bracket.

The pergola beam 70 extends fully through the support tube 32, and may extend beyond the second open end 32B as shown in FIG. 6D. Support fasteners 39, such as screws or bolts, are inserted through the support holes 37 in the side plate 36S and bottom plate 34B of the support tube 34 and into pergola beam 70 to secure the pergola beam 70 to the bracket 10 as also shown in FIG. 6E. As illustrated in FIG. 4, with the pergola beam 70 attached within the support assembly 30 the pergola beam is thereby rigidly supported from the rafter 104 by the bracket 10. The connecting assembly 40 positions the support assembly 30 just below the fascia board 106. The pergola beam 70 can extend horizontally well beyond the structure 100, without additional support.

Figure 7:
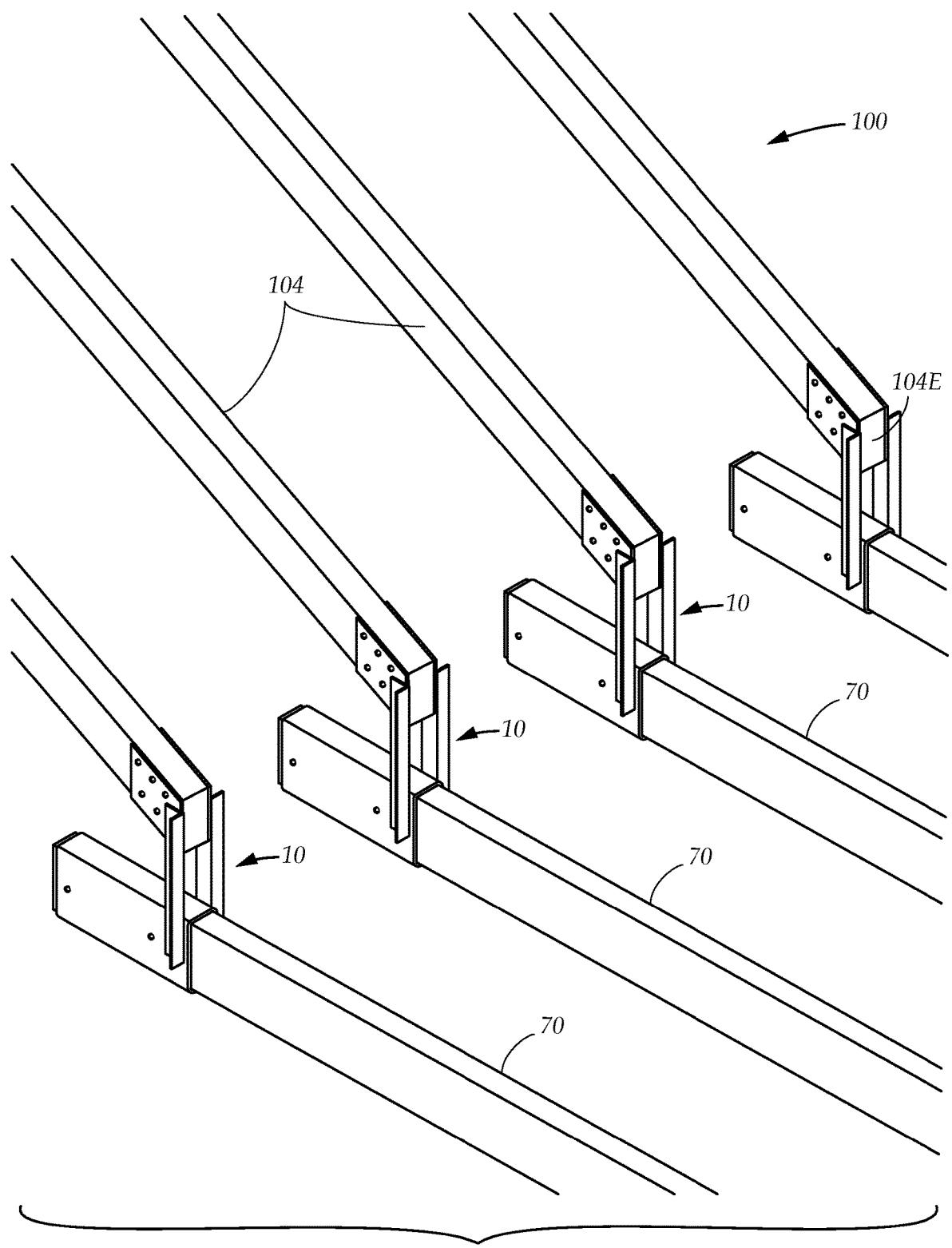
FIG. 7 shows a cantilevered pergola structure, formed by several pergola beams, extending in parallel, each supported from one of the roof rafters by one of the brackets described herein.

FIG. 7 illustrates how the pergola can be created with numerous pergola beams 70, each pergola beam 70 associated with one of the rafters 104 of the existing structure 100. Each pergola beam 70 having its own bracket 10 that connects it to its associated rafter 104. The pergola beams 70 may have transverse connects, such as for ornamental purposes or to increase the amount of shelter or sun protection. But importantly, no additional vertical support is required as the pergola is effectively cantilevered from the existing structure 100 by using the brackets 10.

Referring to FIGS. 2-3, FIG. 5, and FIG. 6B, the advantages of the bracket 10 allow for pergola beams 70 to be attached to the roof rafters 104 without interfering with other components of the existing structure 100 which may be attached thereto. The rafter top 104T will typically be completely covered by roofing material 108, such as roofing boards and shingles. However, a rafter bottom 104B disposed opposite the rafter top 104T may remain accessible. In a preferred embodiment, the mounting assembly 20 has a mounting gap 22G formed between the inside surfaces 22A of the pair of mounting plates 22. The mounting gap 22G corresponds to a void space which is open and accessible between the top edges 22T of the pair of mounting plates 22. The top edges 22T extend upwardly away from the top of the support assembly. The roof rafter 104 may therefore pass into the mounting gap 22G through the top edges 22T.

In another embodiment, each of the mounting plates 22 has a rear edge 22R positioned substantially parallel to the front edge 22F. The mounting gap 22G may be continuously open and accessible along the front edges 22F, the top edges 22T, and the rear edges 22R of the mounting plates 22.

The mounting gap 22G allows the bracket 10 to be secured to the roof rafter 104 by positioning the mounting assembly 20 below the rafter bottom 104B and then raising the mounting assembly 20 upwardly so that the rafter bottom 104B passes through mounting gap 22G between the top edges 22T of the mounting plates 22. The inside surfaces 22A of the mounting plates 22 are then placed in contact with the rafter sides 104S, and the mounting plates 22 are secured to the roof rafter 104 using mounting fasteners 27.

In some embodiments, the mounting gap 22G is open and accessible through the bottom edges 22B of the mounting plates 22, thus allowing the rafter bottom 104B to extend downwardly past the bottom edges 22B when the mounting plates 22 have been secured to the roof rafter 104. This allows the mounting assembly 20 to accommodate roof rafters 104 with a rafter height, as measured between the rafter top 104T and the rafter bottom 104B, which is greater than a mounting assembly height as measured between and the bottom edge 22B of the mounting plates 22.

Furthermore, the mounting gap 22G allows the mounting assembly 20 to be attached to the roof rafter 104 even when the rafter end 104E is covered by the fascia board 106, as the mounting assembly 20 may be secured to a point disposed inwardly along the roof rafter 104 away from the rafter end 104E.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or fdat other orientations) and the spatially relative descriptors used herein interpreted accordingly.

Note that "existing structure" as used herein does not exclude a newly constructed dwelling. It refers to the ability of the bracket system to operate within the constraints of the expected structure of the dwelling and its roof rafters, without requiring modification of the structure, and not to any particular time at which the bracket system is incorporated into the structure.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a bracket system for attaching a cantilevered pergola to a roof rafter. The disclosure is illustrated by example in the drawing figures, and throughout the written description. It should be understood that numerous variations are possible, while adhering to the inventive concept. Such variations are contemplated as being a part of the present disclosure.

What is claimed is:

1. A bracket, for suspending a pergola beam from an existing structure, the existing structure having a vertical wall and roof rafters that each have a rafter top, a rafter bottom, and a rafter end that extends beyond the vertical wall over a ground surface, each of the pergola beams having a supported end, comprising:

a support assembly having a top, a first open end and a second open end a pair of side plates, the support assembly adapted for supporting the pergola beam extending fully between the side plates and between the first open end and second open end;

a mounting assembly including a pair of mounting plates, each mounting plate has a top edge, a rear edge, a front edge, an inside surface, and an outside surface, the pair of mounting plates extend parallel to each other with the inside surface of one of the pair of mounting plates facing the inside surface of the other mounting plate, the mounting plates forming a mounting gap, the mounting gap corresponds to a void space extending between the inside surfaces which is open and accessible along the front edges, the top edges, and the rear edges of the pair of mounting plates, the top edge extends upwardly away from the top of the support assembly, the mounting assembly is adapted to secure to one of the roof rafters with the roof rafter extending through the mounting gap between the inside surfaces and the top edges of the mounting plates extending towards the rafter top; and a connecting assembly positioned between the support assembly and the mounting assembly, the connecting assembly suspends the support assembly from the mounting assembly and provides a vertical offset separating the support assembly from the mounting assembly, the connecting assembly has a pair of vertical arms which extend vertically between the support assembly and the mounting assembly, each vertical arm has a longitudinal face and a transverse face that is connected at a substantially right angle, the longitudinal face is attached to one of the side plates of the support assembly and one of the mounting plates.

2. The bracket as recited in claim 1, wherein:

the connecting assembly suspends the support assembly in a substantially horizontal position, wherein the first open end of the support assembly is adapted to extend away from the vertical wall and the second open end of the support assembly is adapted to extend towards the vertical wall; and the top edge of each of the pair of mounting plates extends upwardly at an acute angle away from the top and the first open end of the support assembly.

3. The bracket as recited in claim 2, wherein the support assembly further has a top plate and a bottom plate which extend between the first open end and the second open end, and the support assembly is configured as a support tube formed by the top plate, the bottom plate, and the pair of side plates.

4. The bracket as recited in claim 3, wherein each of the vertical arms is attached to the outside surface of one of the mounting plates and to one of the side plates of the support tube.

5. The bracket as recited in claim 1, wherein each of the mounting plates has a bottom edge which is substantially parallel to the top edge, the mounting assembly is configured to allow the rafter bottom to enter the mounting gap between the top edges of the pair of mounting plates and extend downwardly through the bottom edges of the pair of mounting plates.

6. The bracket as recited in claim 5, wherein the mounting plates each have mounting holes that extend fully between the inside surface and the outside surface, and further comprising mounting fasteners adapted for extending through the mounting holes and into the rafters.

7. The bracket as recited in claim 6, wherein the support assembly has support holes extending through the side plates and through the bottom plate, and further comprising support fasteners adapted for extending through the support holes and into the pergola beams.

\* \* \* \* \*